Figure 1:
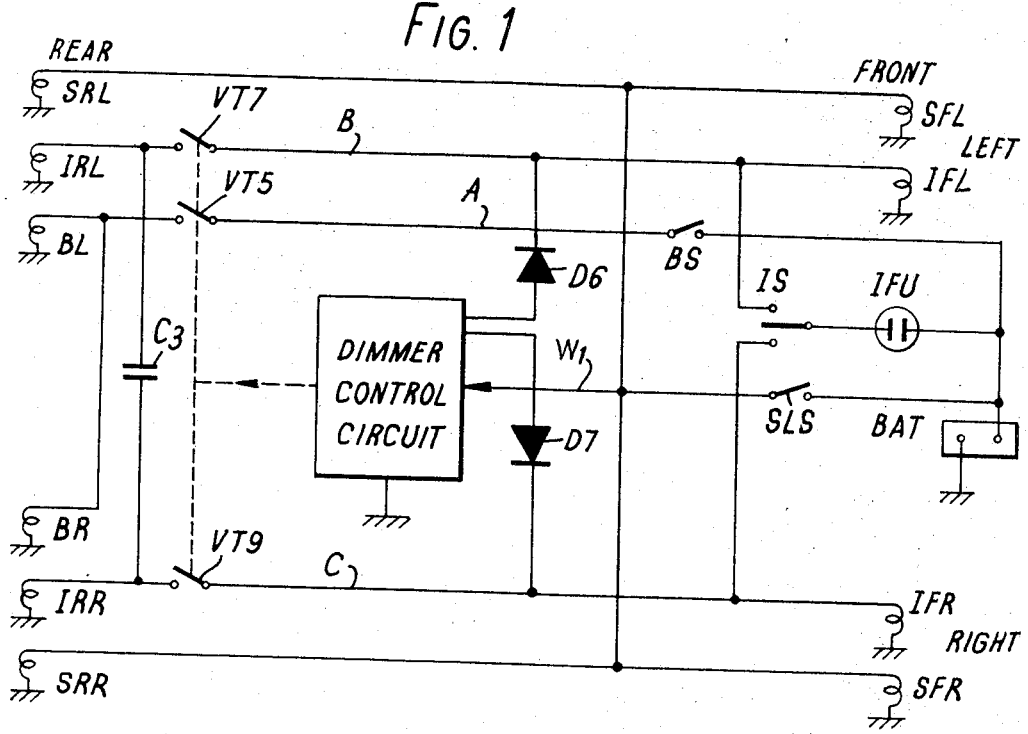

United States Patent
Fowler et al.

[11] 3,840,851
[45] Oct. 8, 1974

[54] VEHICLE SIGNAL LIGHTING SYSTEMS
[75] Inventors: Albert Lewis Fowler; Alastair Kershaw Stevenson, both of Fife, Scotland
[73] Assignee: Emihus Microcomponents Limited, Glenrothes, Fife, Scotland
[22] Filed: June 29, 1973
[21] Appl. No.: 375,080

[30] Foreign Application Priority Data
June 30, 1972  Great Britain .................. 30664/72

[52] U.S. Cl. ............................... 340/74, 315/77
[51] Int. Cl. ............................................. B60q 1/26
[58] Field of Search ............ 340/74, 78; 315/77, 79, 315/82, 83

[56] References Cited
UNITED STATES PATENTS
| | | | |
|---|---|---|---|
| 3,040,207 | 6/1962 | Grontowski | 315/77 |
| 3,283,161 | 11/1966 | Ubukata et al. | 315/79 X |
| 3,316,441 | 4/1967 | Nallinger | 340/78 X |
| 3,371,241 | 2/1968 | Amacher | 315/82 X |

Primary Examiner—Donald J. Yusko
Attorney, Agent, or Firm—Fleit, Gipple & Jacobson

[57] ABSTRACT

A vehicle lighting system which provides facility for rearward facing warning lamps such as turn indicators and stop lamps to be automatically dimmed in conditions of poor ambient lighting. Each lamp to be so dimmed has connected in series therewith a switchable device, for example a power transistor, which is caused for normal operation, to remain in a highly conductive state. When the side lamps of the vehicle are turned on, and/or when the ambient lighting falls below a threshold level, an oscillator circuit is energized which causes the transistor to alternate between highly conductive and highly resistive states so as to reduce the electrical energy fed to the lamp. In the event that said lamp is a flashing turn indicator lamp, an expedient is disclosed for causing the flashing rate to remain substantially constant despite the reduction in power consumed by the lamp.

7 Claims, 2 Drawing Figures

VEHICLE SIGNAL LIGHTING SYSTEMS

The present invention relates to vehicle lighting systems and it is an object of the invention to provide an improved vehicle lighting system which permits the intensity of at least one lamp included in the system to be varied in accordance with prevailing conditions of lighting.

Whilst it is desirable for warning lamps such as turn indicator and brake lights to operate with their maximum intensity in daylight, it is also desirable that such lamps should be dimmed at night, or under some conditions of poor ambient light, or in general under most conditions in which the side lights of the vehicle, at least, should be illuminated. It is one object of the invention to provide a vehicle lighting system including a control circuit by means of which such dimming can be performed automatically.

Some control circuits have already been proposed for achieving the above object, but they have not proved entirely satisfactory. It has been usual in such circuits to provide a resistor in series with each lamp to be dimmed and to connect a pair of relay contacts across each such resistor whereby in normal (i.e. daylight) operation each resistor is bypassed via a short circuit across its respective relay contacts but in conditions of poor light the short circuit is broken. In such circuits, a substantial amount of heat is developed during operation of a dimmed lamp. Moreover, relays tend to be unreliable and the currents to be switched (of the order of one or more amperes) are such as to tend to cause arcing at the relay contacts.

According to the invention there is provided a circuit arrangement for selectively reducing the intensity of illumination of rearward facing turn indicator lamps fitted to a vehicle and arranged to be supplied with electric current, pulsed at a given rate, in response to the actuation of a direction indicator switch, the arrangement comprising a respective device electrically connected in series between the switch and each of said lamps, each of said devices being capable of assuming a first condition, in which it presents substantially no impedance to said current, or a second condition, in which it presents a substantial impedance to said current, control means, operative on said devices, for holding said devices in said first condition to enable the lamps to be illuminated with full intensity and for responding to a control signal to cause said devices to alternate between said first and second conditions so as to interrupt said current at a rate substantially higher than said given rate to enable the lamps to be illuminated with reduced intensity, and the arrangement further comprising frequency selective impedance means associated with said lamps and arranged to present a lower impedance to electrical current interrupted at said higher rate than to electrical current pulsed at said given rate, thereby to provide a leakage current path for said interrupted current in addition to the path through a lamp such that the overall current drawn by the arrangement remains within predetermined limits whether the lamps are illuminated with full or reduced intensity.

Suitably, each of the said devices comprises a power transistor having its collector-emitter path connected in series between the switch and the respective lamp, the control signal is determined by the state of energisation of the side lamps of the vehicle, and the control means comprises an oscillator circuit adapted to drive the base electrodes of said power transistors. The oscillator circuit is made effective to cause said power transistors, in the dimmed condition, to be turned on and off at a rate which is considerably higher than the usual rate of operation of a direction indicator flasher unit.

As the lamps to be dimmed are direction indicator lamps, the current taken via the direction indicator flasher unit could be considerably less in the dimmed condition than in the normal condition. Since the rate of operation of the flasher unit is dependent upon the size of the current fed therethrough this discrepancy could cause an undesirably great variation in the rate at which the flasher unit operates. In order to reduce this variation, and in accordance with a further aspect of the invention, a capacitor is coupled from the junction point between one of said lamps and its series connected device and the junction point between the other of said lamps and its series connected device, thereby providing a leakage path for current of said oscillator frequency so as to increase the current flow via said unit.

Some vehicles are provided with a hazard warning arrangement, by means of which all four direction indicator lamps are caused to flash simultaneously. When such an arrangement is in operation it is desirable that the lights operate with their maximum intensity, and it is therefore desirable that the dimming action of the control means can be inhibited under these circumstances. In accordance with another aspect of the invention, the control means is fed with power via a pair of parallel connections, which include respective unidirectionally conductive means, respectively connected to the left and right turn front indicator lamps, whereby the power supply to said control means is cut off when both said front lamps are simultaneously energised.

Figure 2:
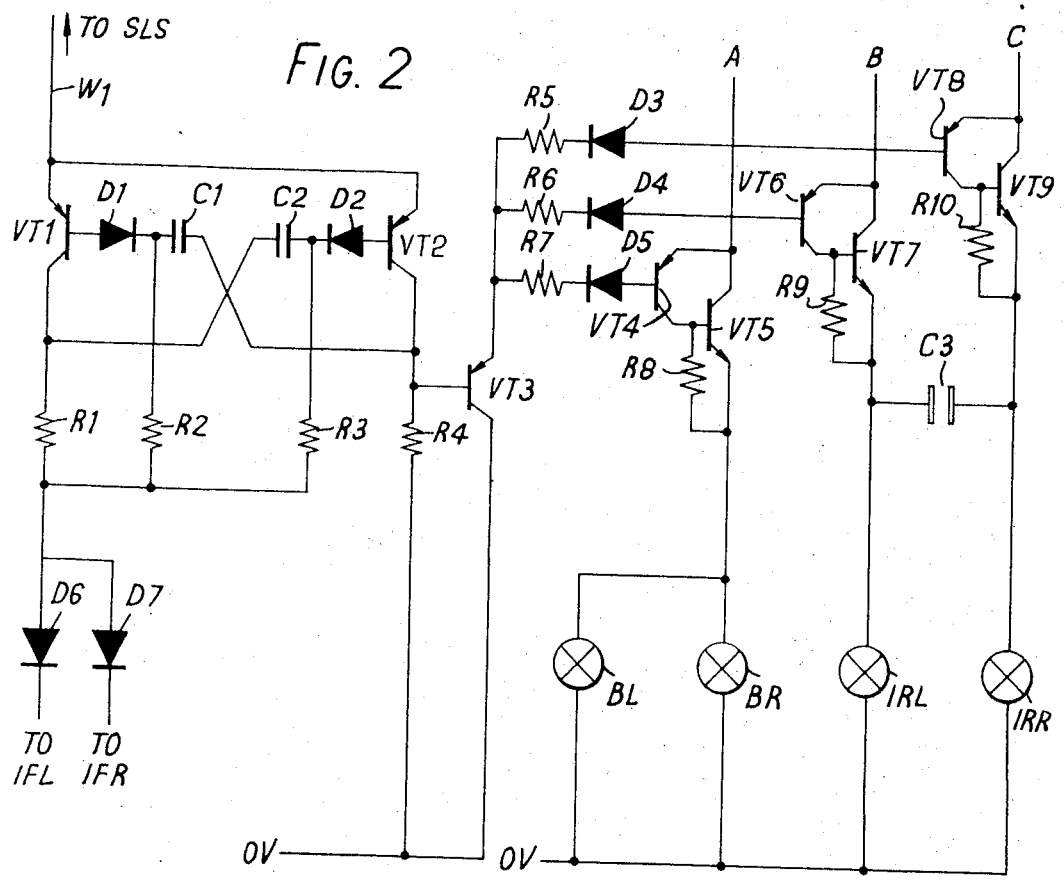

In order that the invention may be clearly understood and readily carried into effect, one embodiment thereof will now be described, by way of example only, with reference to the accompanying drawings, in which:

FIG. 1 shows in schematic form part of a vehicle lighting system in accordance with one embodiment of the invention, and FIG. 2 shows, in more detail, part of the system shown in FIG. 1.

Referring now to FIG. 1 a vehicle lighting system includes four side lamps, SFL, SFR, SRR and SRL; four flashing indicator lamps IFL, IFR, IRR and IRL and two brake lamps BL and BR.

The side lamps are supplied with power from a battery BAT via a side lamp switch SLS, the flashing indicator lamps are fed with power from the battery via an indicator switch IS and a flasher unit IFU, and the brake lamps are fed with power from the battery via a brake lamp switch BS which is operated in response to the application of the vehicle's brakes.

In a typical arrangement, the indicator lamps and the brake lamps are each rated at 21 watts, whereas the side lamps are each rated at only about 6 or 8 watts. The higher wattage of the indicator and brake lamps can make them an annoyance to drivers of following vehicles, particularly under conditions of poor ambient lighting. Thus, in order that the brake lamps BL and BR, the rear indicator lamp on the left hand side of the vehicle, IRL and the rear indicator lamp on the right hand side of the vehicle, IRR, can be dimmed under conditions of poor ambient lighting but can be energised with their full intensity in daylight, respective cables, A, B and C, connecting these lamps to their respective switches include respective switchable devices VT5, VT7 and VT9 which are controlled under the influence of a dimmer control circuit as shown schematically in FIG. 1. The dimmer control circuit is energised via a lead W1 when the side lamp switch SLS is operated to energise the four side lamps.

Referring now to FIG. 2, wherein the dimmer control circuit is shown in more detail, the switchable devices VT5, VT7 and VT9 comprise respective power transistors. For full intensity operation of the respective lamps, these transistors are operated in a fully conductive condition, whereas in order to dim the lamps the transistors are switched between fully conductive and fully insulating states at a convenient frequency provided by an electrical oscillator. The intensity in the dimmed condition is determined by the ratio of the time which the transistors spend in their conductive state to that spent in their insulating state. In the dimmed condition, the power lost or dissipated in the power transistors is considerably less than that of the aforementioned resistor-relay method for comparable intensity. Furthermore the lamp currents are switched by solid state devices, and this provides improved reliability of operation compared with the case when the lamp currents are switched by relay contacts.

In FIG. 2, the oscillator comprises a conventional multivibrator including transistors VT1 and VT2. The multivibrator also includes capacitors C1 and C2 and resistors R2 and R3, and the values of these components are chosen to set the operating frequency of the oscillator and the on/off (or mark-to-space) ratio for the correct intensity in the dim condition. The oscillator is enabled via the connection W1, by means of a control signal of battery voltage derived when the side lamps are illuminated, i.e., when switch SLS is made. Diodes D6 and D7 provide, in normal operation, the return paths for the operating current of the multivibrator to the 0 volt rail via respective ones of the front indicator lamp filaments, the current being insufficient to illuminate the filaments. Such connection ensures that the dim condition is over-ridden i.e., the oscillator is made inoperative, when a hazard warning system of the kind described hereinbefore is in operation. In such operation, as pointed out previously, all four indicator lamps flash on and off simultaneously and when the cathodes of both diodes D6 and D7 are simultaneously driven positive, the oscillator is inhibited, thus restoring the full intensity condition during the flash period.

A transistor VT3 is used to buffer the base drive currents to the power transistor stages. Diodes D5, D4 and D3 are provided to prevent reverse voltage base-emitter breakdown of respective P-N-P transistors VT4, VT6 and VT8 with inputs A, B and C at 0 volts via cold filament connections at these points or other similar connections. Each power transistor switch includes a P-N-P driver (VT4, VT6 and VT8 respectively), each associated with a respective N-P-N power transistor (VT5, VT7, VT9 respectively). The transistor VT4 is connected in series with the brake lamps, and the transistors VT7 and VT9 are connected in series with the left and right indicator lamps respectively.

One problem encountered when dimming a rear indicator lamp by any method is that the effective heating current flowing in the associated flasher unit is reduced, and as pointed out earlier, this causes the flasher frequency to change. A permissible change of only eight or less flashes per minute as between the normal and dim conditions, can be tolerated, and so a ballast load has to be connected to the flasher unit in the dim condition. Hitherto, this ballast load connection has been performed by means of expensive additional circuits, and moreover previous solutions to this problem have not been completely satisfactory in operation. In accordance with a further feature of this invention it has been found that a suitable capacitor C3 connected between the emitters of the transistors VT7 and VT9 provides the necessary ballast load in the dim condition.

The capacitor 3 is dimensioned so as to pass signals of the frequency of the multivibrator but to substantially block signals of the frequency of the flasher unit IFU. Thus in normal daylight operation, with the multivibrator ineffective, the presence of C3 does not substantially affect the current drawn via the unit IFU from the battery BAT.

When the multivibrator circuit is operating, however, the capacitor C3 presents a low impedance path to signals which are chopped at the multivibrator frequency and effectively provides a parallel path for such signals via C3 and the cold filament of the non-energised rear indicator lamp IRR. Thus although the effective current drawn through the unit IFU by the lamp IRL is reduced, the additional current drawn via C3 by the lamp IRR is effective to compensate, at least in part, for the aforementioned reduction in current through the unit IFU. This means that the variation in flashing rate as between the normal and dimmed conditions can be substantially reduced as compared with a system not including the capacitor C3. In practice the value of C3 is chosen to give practically the same current through the unit IFU in the dim condition as in the normal condition. The heating effect of the current fed via capacitor C3, through the inoperative lamp filament (IRR in this case) is so slight as to have a negligible effect upon the operation of the system. The symmetrical connection of C3 between the two rear indicator lamps and the fact that it automatically contributes a capacitive ballast current, during the dim condition only, provides an inexpensive and effective means of maintaining flasher frequency.

Although the invention has been described in relation to one embodiment thereof, it will be appreciated that modifications may be made to the circuit without departing from the scope of the invention. For example, instead of the capacitor C3, individual ballast capacitors could be connected in parallel with each rear indicator lamp. The extra power dissipated by such an arrangement is small, mainly consisting of an increase in the dissipation of the power transistor with additional minimal losses in the respective capacitors. As a further modification of the invention the dimmer control circuit need not be energised in response to the illumination of the side lamps of the vehicle, it may be energised instead (or in addition) in response to a signal derived from a photo-sensitive element such as a photo-transistor. If such a photo-sensitive arrangement is used, it may be preferable for the energising connection (e.g. W1) to the dimmer control circuit to be coupled via the ignition circuit so that the multivibrator does not draw current from the battery when a vehicle is parked at night.

Furthermore, there are some road conditions (such as fog) under which the side lamps of the vehicle (at least) should be energised, but it is desirable for the brake lamps and indicator lamps to operate at their full intensity. If these circumstances, the operation of the dimming control circuit can be inhibited by breaking an override switch (not shown) in the line W1. It is preferable that some forms of audible or visual warning be provided to remind the driver that the dimming circuit is inoperative, so that he can make the over-ride switch again when the fog hazard has passed. As an additional safety measure, the over-ride switch can be caused to make automatically each time the ignition is switched off or on.

What we claim is:

1. A circuit arrangement for selectively reducing the intensity of illumination of rearward facing turn indicator lamps fitted to a vehicle and arranged to be supplied with electric current, pulsed at a given rate, in response to the actuation of a direction indicator switch, the arrangement comprising a respective device electrically connected in series between the switch and each of said lamps, each of said devices being capable of assuming a first condition, in which it presents substantially no impedance to said current, or a second condition, in which it presents a substantial impedance to said current, control means, operative on said devices, for holding said devices in said first condition to enable the lamps to be illuminated with full intensity and for responding to a control signal to cause said devices to alternate between said first and second conditions so as to interrupt said current at a rate substantially higher than said given rate to enable the lamps to be illuminated with reduced intensity, and the arrangement further comprising frequency selective impedance means associated with said lamps and arranged to present a lower impedance to electrical current interrupted at said higher rate than to electrical current pulsed at said given rate, thereby to provide a leakage current path for said interrupted current in addition to the path through a lamp such that the overall current drawn by the arrangement remains within predetermined limits whether the lamps are illuminated with full or reduced intensity.

2. An arrangement according to claim 1 wherein said frequency selective impedance means comprises a capacitor.

3. An arrangement according to claim 2 wherein said capacitor is connected from the junction of one of said lamps and its series-connected device to the junction of another of said lamps and its series connected device.

4. An arrangement according to claim 1 wherein the said lamps comprise first and second lamps, respectively situated adjacent opposite sides of the vehicle, said vehicle also being fitted with third and fourth lamps which face forwardly thereof and are situated on either side of the vehicle, the third lamp being connected so as to pulse simultaneously with the first lamp and the fourth lamp being arranged to pulse simultaneously with the second lamp; the third and fourth lamps being connected directly to said direction indicator switch, wherein the vehicle further includes a hazard warning system whereby all four of said lamps can be caused to pulse simultaneously, means being provided for overriding said control means so as to hold both said series connected devices in said first condition when said pulsed current is applied simultaneously to said four lamps.

5. An arrangement according to claim 4 wherein said over-riding means comprises respective unidirectionally conductive means connected from said control means to each of said third and fourth lamps, the arrangement being such that when both of said third and fourth lamps receive pulsed current simultaneously, the operation of said control means is inhibited.

6. An arrangement according to claim 1 including inhibit means for inhibiting the operation of said control means so as to cause each of said series connected devices to remain in said first condition.

7. An arrangement according to claim 6 including warning means for providing an indication when the operation of said control means is inhibited.

* * * * *